(12) United States Patent
Helms, Jr. et al.

(10) Patent No.: US 6,455,612 B2
(45) Date of Patent: Sep. 24, 2002

(54) APPARATUS AND METHOD FOR DIRECT INJECTION OF ADDITIVES INTO A POLYMER MELT STREAM

(75) Inventors: Charles F. Helms, Jr., Asheville, NC (US); Dominick A. Burlone, Asheville, NC (US); James L. Huff, Mars Hill, NC (US); Thomas Kessler, Schifferstadt (DE); Herman Brandt, Neustadt (DE); Walter Gotz, Ludwigshafen (DE); Jürgen Hofmann, Ludwigshafen (DE)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/793,445

(22) Filed: Feb. 27, 2001

Related U.S. Application Data

(62) Division of application No. 09/731,656, filed on Dec. 8, 2000, now Pat. No. 6,391,239, which is a division of application No. 09/206,011, filed on Dec. 4, 1998.

(51) Int. Cl.$^7$ ............................................. C08K 9/00
(52) U.S. Cl. ................. 523/200; 523/207; 523/210; 428/373; 428/375; 428/398; 524/399; 524/400
(58) Field of Search ................. 523/200, 207, 523/210; 524/399, 400; 428/373, 375, 376, 378, 398, 400

(56) References Cited

U.S. PATENT DOCUMENTS

| | | | |
|---|---|---|---|
| 3,546,328 A | 12/1970 | Lodge et al. ................. 264/171 |
| 4,135,870 A | 1/1979 | Wallace et al. .............. 425/130 |
| 4,259,277 A | 3/1981 | Hill ............................... 264/75 |
| 4,302,409 A | 11/1981 | Miller et al. ................ 264/45.9 |
| 4,338,274 A | 7/1982 | Hill ............................ 264/171 |
| 4,370,114 A | 1/1983 | Okamoto et al. ......... 425/131.5 |
| 4,448,736 A | 5/1984 | Emery et al. .............. 264/40.1 |
| 4,626,187 A | 12/1986 | Kamada ................... 425/131.1 |
| 4,657,499 A | 4/1987 | Lewellen et al. ........... 425/208 |
| 4,941,812 A | 7/1990 | Samelson ................. 425/131.5 |
| 5,057,262 A | 10/1991 | Nohr et al. ................... 264/211 |
| 5,204,396 A * | 4/1993 | Murakami et al. ........... 524/394 |
| 5,376,702 A | 12/1994 | Stibal et al. ................. 523/313 |
| 5,458,478 A | 10/1995 | Stibal et al. ............. 424/382.3 |
| 5,516,476 A | 5/1996 | Haggard et al. ............. 264/211 |
| 5,614,142 A | 3/1997 | Lilly et al. ................... 264/211 |
| 5,707,569 A | 1/1998 | Priester et al. ................ 264/39 |
| 5,851,562 A | 12/1998 | Haggard et al. .......... 425/131.5 |
| 5,869,106 A | 2/1999 | Rosaldo .................... 425/131.5 |
| 5,872,205 A | 2/1999 | Balke et al. .............. 528/502 F |
| 5,955,116 A | 9/1999 | Kehoe et al. ............. 425/131.1 |
| 6,200,125 B1 | 3/2001 | Akutagawa ................. 425/462 |

FOREIGN PATENT DOCUMENTS

| | | | |
|---|---|---|---|
| EP | 0 457 441 A2 | 11/1991 | .............. C08J/3/20 |
| EP | 0 161 857 | 11/1995 | ........... B29C/47/04 |
| JP | 6-23822 | 1/1994 | ........... B29C/47/20 |
| WO | WO 96/14450 | 5/1996 | ............. D01D/4/06 |

OTHER PUBLICATIONS

Patent Abstract of Japan, vol. 018, No. 229 (M–1598); Apr. 26, 1994.
Patent Abstract of Germany, XS 9911987010 MA; 99119870.6.

* cited by examiner

*Primary Examiner*—Edward J. Cain
(74) *Attorney, Agent, or Firm*—Nixon & Vanderhye P.C.

(57) ABSTRACT

This invention provides an apparatus and method for injecting an additive directly into a polymer melt stream. The method comprises supplying a melt flow of a polymeric host material to a die assembly having a thin-plate assembly and injecting at least one additive into at least one predetermined location in a cross-section of the melt flow of the polymeric host material while the melt flow passes through the die assembly. The method achieves uniform dosing of the one or more additives in the extrusion direction in the polymeric host material without homogeneously mixing the one or more additives and the polymeric host material. The apparatus for directly injecting one or more additives into a polymer melt stream comprises a pumping system, a die assembly having a thin-plate assembly, and a distribution line.

9 Claims, 8 Drawing Sheets

APPARATUS AND METHOD FOR DIRECT INJECTION OF ADDITIVES INTO A POLYMER MELT STREAM

This application is a division of application Ser. No. 09/731,656, filed Dec. 8, 2000, now U.S. Pat. No. 6,391,239, which is a division of application Ser. No. 09/206,011, filed Dec. 4, 1998.

FIELD OF THE INVENTION

This invention relates to the introduction of additives into a polymer. More specifically, this invention relates to an apparatus and method for the direct injection of additives into a polymer melt stream.

BACKGROUND OF THE INVENTION

The addition of additives to molten polymers has been accomplished by several means. One such means is blending the additives and the polymer chips together in the polymer chip dryer or in the storage hopper prior to extruding the polymer chips and the additives into strands for pelletizing. Another method for introducing additives into a polymer melt stream is to inject the additives at the throat, the mixing zones, or the vent of the extruder and to allow the extrusion process to fully blend the additives into the polymer components. A third method of introducing additives into a polymer melt stream involves injecting the additives into static mixing elements located downstream of the extruder to fully blend the additives into the polymer components.

Problems arise, however, in that some additives may be heat sensitive and may also cause polymer degradation or other undesirable reactions with the polymer if blended with the polymer before extrusion into polymer strands. Moreover, some additives such as, for example, zinc stearate, can cause extruder screw slippage.

A way to overcome such problems is to introduce the additives into a polymer melt stream after extrusion of the polymer into strands for pelletizing. One such method is to coat the polymer pellets with the additives after the polymer extrusion process has occurred. A problem arises, however, in that for additives that amount to less than about 1 percent of the concentration of the total polymer product, this method does not generally result in a good uniform dosing of additive to polymer.

A need, therefore, exists for a method of introducing additives into the polymer that overcomes the above-discussed limitations.

SUMMARY OF THE INVENTION

It is a primary object of the present invention to introduce one or more additives directly into a polymer melt stream.

Another object of the present invention is to strategically place one or more additives at specific locations within an extruded polymer strand using a thin plate die assembly.

Thus, according to one embodiment of the present invention, there is provided a method of directly injecting one or more additives into a polymer melt stream comprising the steps of supplying a melt flow of a polymeric host material to a die assembly having a thin-plate assembly and injecting at least one additive into at least one predetermined location in a cross-section of the melt flow of the polymeric host material while passing the melt flow of the polymeric host material through the die assembly. The one or more additives is injected into one or more exact locations within the cross-section of the polymeric host to achieve uniform dosing, in the extrusion direction, of the one or more additives within the polymeric host material without homogeneously mixing the one or more additives and the polymeric host material into a single phase.

According to another aspect of the present invention there is provided an apparatus for carrying out the direct injection of one or more additives into the melt flow of a polymeric host material comprising a pumping system, a die assembly having a thin-plate assembly, and a distribution line.

According to yet another embodiment of the present invention there is provided a method of making pellets from polymers comprising the steps of supplying a melt flow of at least one polymeric host material to a die assembly comprising a thin-plate assembly, directing the injection of at least one additive into at least one predetermined location in a cross-section of the melt flow while passing the melt flow through the die assembly to form strands, and cutting the polymer strands into pellets. The resulting pellets have a precise amount of additive dosed at the at least one predetermined location in the cross-section of the polymeric host material. The uniform dosing of the one or more additives is achieved without homogeneous mixing of the additive and the polymeric host material.

By precisely injecting low concentrations of one or more sensitive polymer additives into the polymeric host material at the die, degradation and chemical reactions in the extruder are avoided, handling of additive material is simplified, and uniformity of the additive in the strand of polymeric host material is improved. Moreover, accurate placement of additives in the cross-section of a strand of polymeric host material is achieved.

The above and other objects, effects, features, and advantages of the present invention will become more apparent from the following detailed description of the preferred embodiments thereof, particularly when viewed in conjunction with the accompanying drawings wherein like reference numbers in the various figures are used to designate like components.

BRIEF DESCRIPTION OF THE DRAWINGS

FIG. 1c 1b is a schematic of a second alternate pumping system useful in the apparatus of the present invention.

DETAILED DESCRIPTION OF THE PREFERRED EMBODIMENTS

Figure 1A:
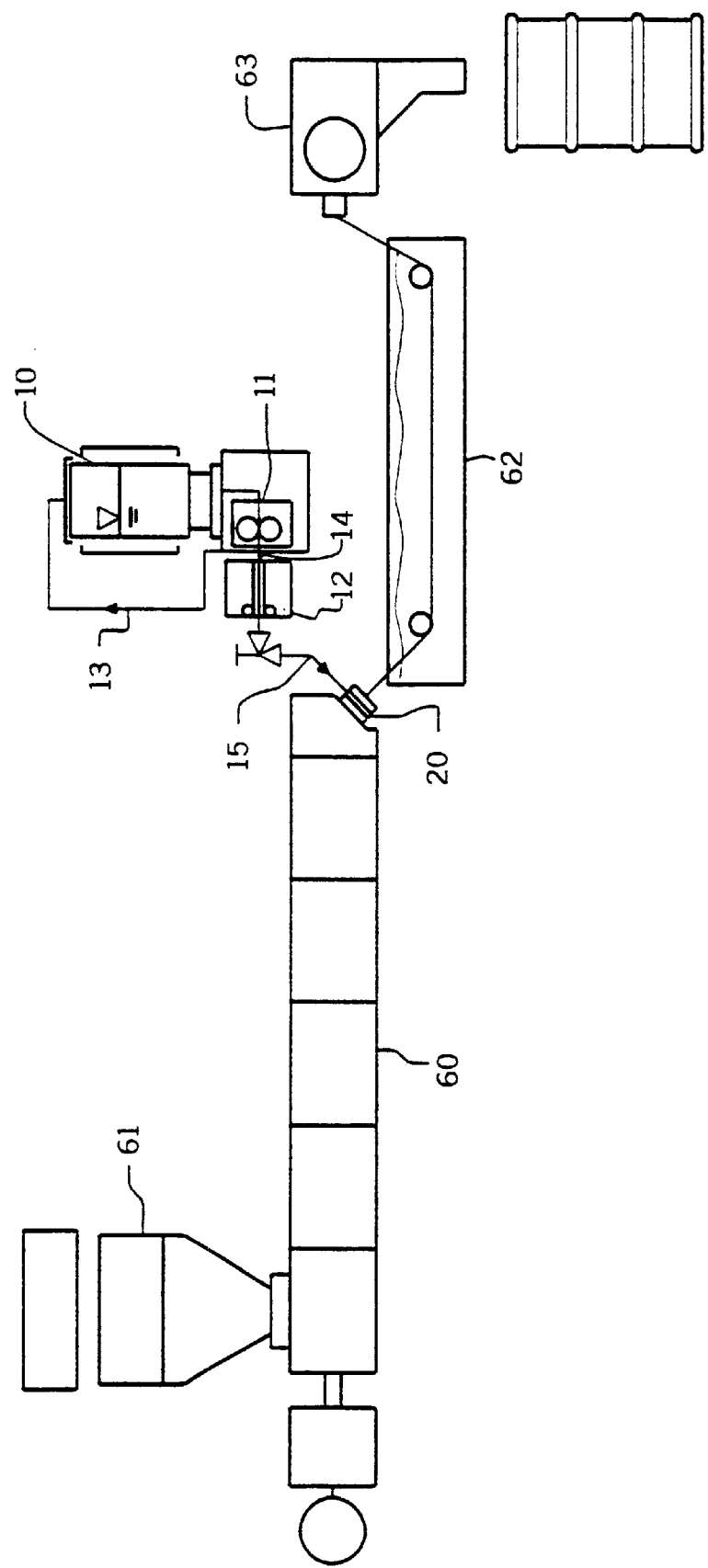
FIG. 1a is a schematic of the apparatus of the present invention.

To promote an understanding of the principles of the present invention, descriptions of specific embodiments of the invention follow, and specific language is used to describe the same. It will nevertheless be understood that no limitation of the scope of the invention is intended by the use of this specific language and that alterations, modifications, equivalents, and further applications of the principles of the invention discussed are contemplated as would normally occur to one of ordinary skill in the art to which the invention pertains.

In one embodiment, the present invention is a method of directly injecting one or more additives into a polymer melt stream. The method comprises the steps of supplying a melt flow of a polymeric host material to a die assembly having a thin-plate assembly and injecting at least one additive into at least one predetermined location in a cross-section of the melt flow of the polymeric host material while passing the melt flow of the polymeric host material through the die assembly. The one or more additives is injected into one or more exact locations within the cross-section of the polymeric host to achieve uniform dosing in the extrusion direction of the one or more additives within the polymeric host material without homogeneously mixing the one or more additives and the polymeric host material into a single phase.

In another embodiment, the present invention is an apparatus for directly injecting one or more additives into a polymer melt stream. The apparatus comprises a pumping system, a die assembly having a thin-plate assembly, and a distribution line. The apparatus of the present invention is designed to inject one or more additives into the melt flow of a polymeric host material at one or more specific locations in the cross-section of the polymeric host material as the polymeric host material passes through a die assembly and is shaped into polymer strands. While the resulting pellets have a precise amount of one or more additives dosed at one or more specific locations of the cross-section of the polymeric host material, the polymer and the one or more additives are not homogeneously mixed as a single phase.

In yet another embodiment, the present invention is a method of making pellets from polymers comprising the steps of supplying a melt flow of at least one polymeric host material to a die assembly comprising a thin-plate assembly, directing the injection of at least one additive into at least one predetermined location in a cross-section of the melt flow while passing the melt flow through the die assembly to form strands, and cutting the polymer strands into pellets.

Virtually any suitable polymer may be usefully employed in the practice of this invention. In this regard, suitable classes of polymeric materials that may be employed in the practice of this invention include polyamides, polyesters, polystyrene, acrylics, polyolefins, and combinations thereof.

One particularly preferred class of polymers useful in this invention is polyamide polymers. In this regard, those preferred polyamides useful in the practice of this invention are those that are generically known by the term "nylon" and that are long chain synthetic polymers containing amide (—CO—NH—) linkages along the main polymer chain. Suitable polyamides include those polymers obtained by the polymerization of a lactam or an amino acid and those polymers formed by the condensation of a diamine and a dicarboxylic acid. Examples of particularly useful polyamides are nylon 6, nylon 6/6, nylon 6/9, nylon 6/10, nylon 6T, nylon 6/12, nylon 11, nylon 12, nylon 4/6, and copolymers or mixtures thereof. Polyamides can also be copolymers of nylon 6 or nylon 6/6 and a nylon salt obtained by reacting a dicarboxylic acid component such as terephthalic acid, isophthalic acid, adipic acid, or sebacic acid with a diamine such as hexamethylene diamine, methaxylene diamine, or 1,4-bisaminomethylcyclohexane. Most preferred is nylon 6. The polymers are generally supplied in the form of powders, chips, or granules.

Additives that may be injected according to the present invention include a variety of additives such as, for example, antistatic agents, blowing agents, delusterants, dye regulating agents, fillers, flame retardants, heat stabilizers, light stabilizers, lubricants, pigments, plasticizers, and combinations thereof. It is especially preferred to add lubricants such as, for example, zinc stearate and calcium stearate, by the process of the present invention because of the problems associated with adding lubricants to the polymer melt stream before extrusion.

Figure 2:
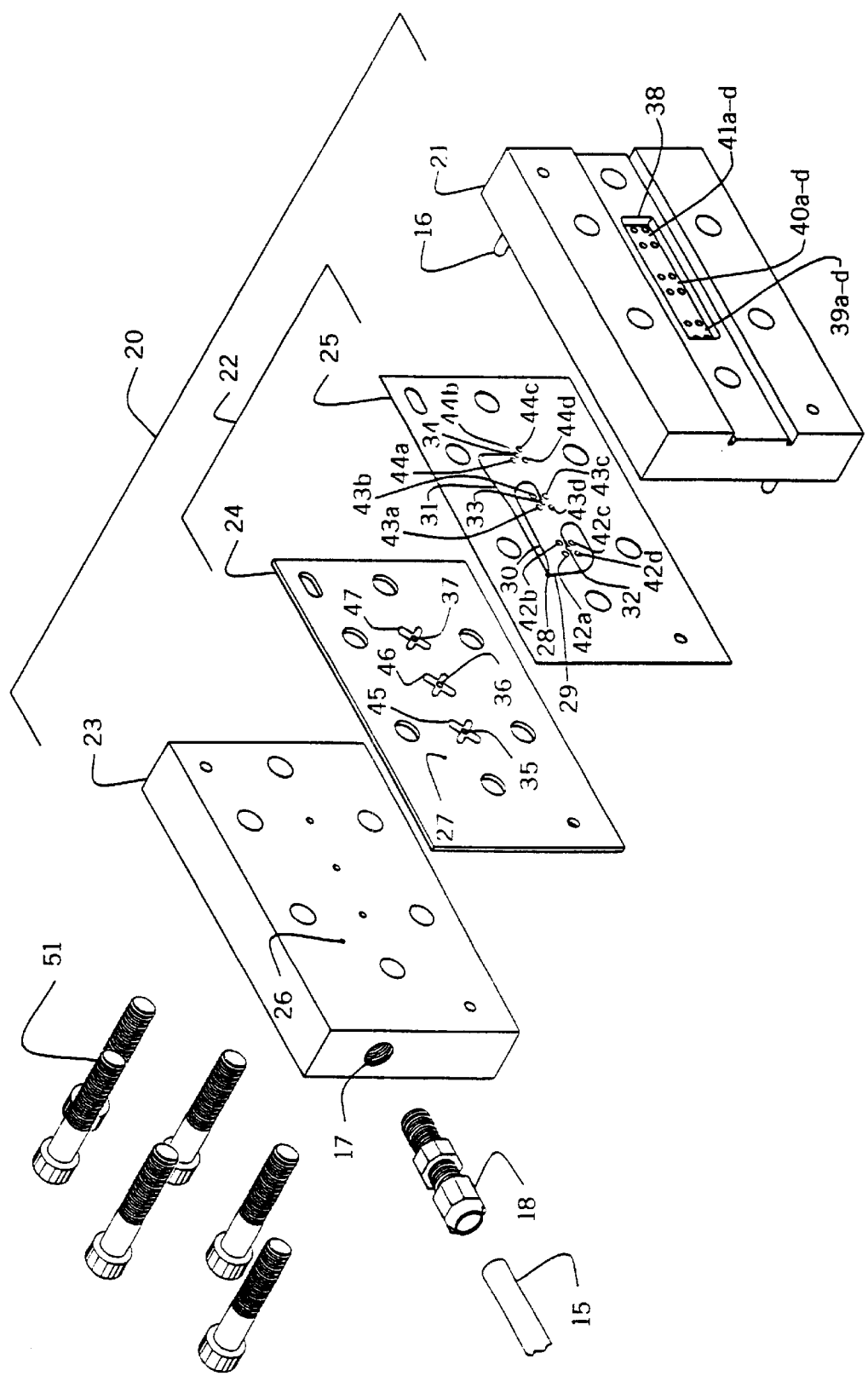
FIG. 2 is an exploded view of one configuration of the thin-plate assembly in the die assembly used in the apparatus of the present invention.
Figure 3:
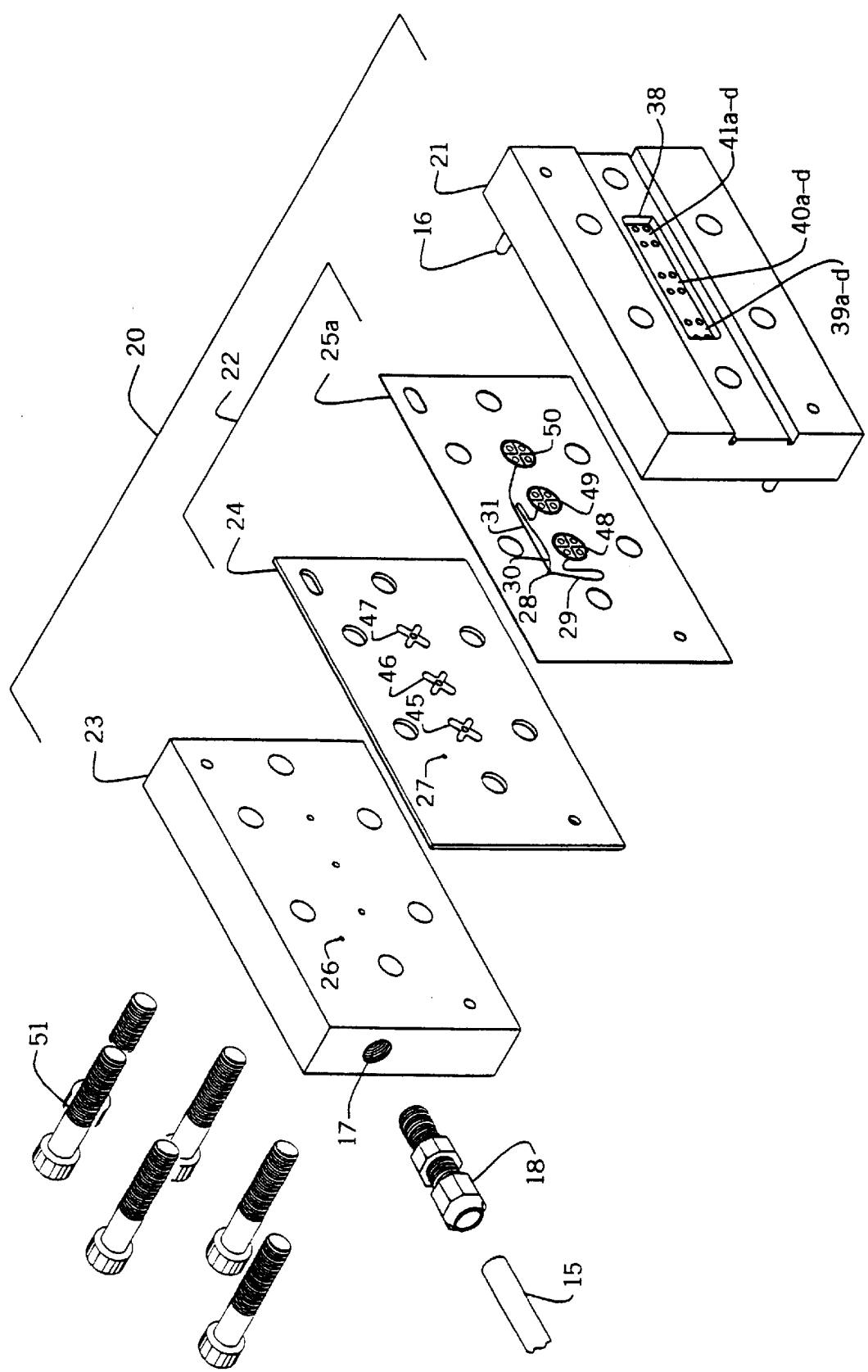
FIG. 3 is an exploded view of a second configuration of the thin-plate assembly in the die assembly used in the apparatus of the present invention.
Figure 4:
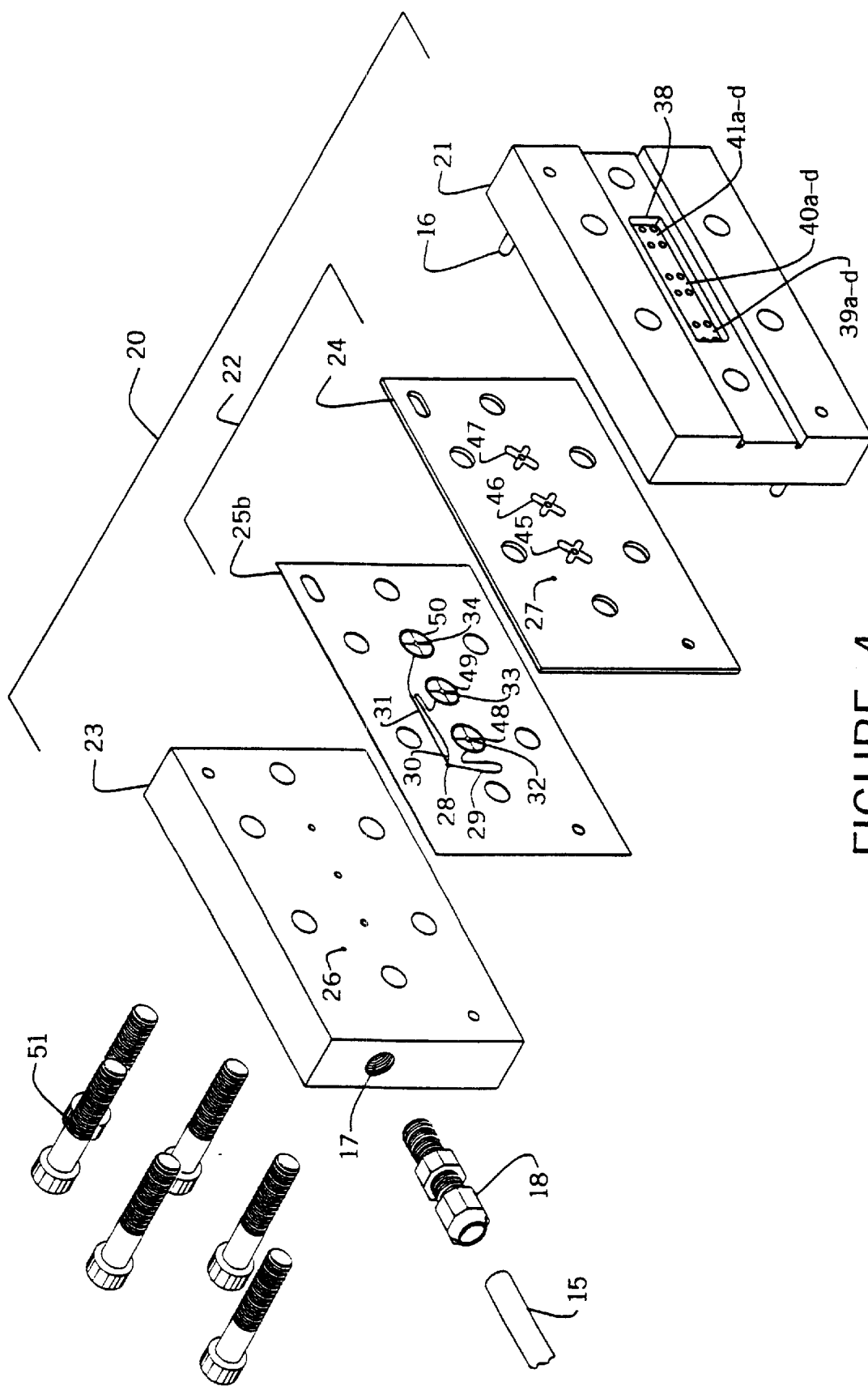
FIG. 4 is an exploded view of a third configuration of the thin-plate assembly in the die assembly used in the apparatus of the present invention.

Referring now to the drawings, there is shown in FIG. 1a the apparatus of the present invention. The apparatus includes a die assembly, a pumping system, and a distribution line. The pumping system comprises additive supply 10, recirculation pump 11, and metering pump 12. Additive supply 10 may be a tank or an extruder. One or more additives is maintained at the proper temperature within additive supply 10 and pumps 11, 12 using heat tracing and insulation (not shown). In general, pumps 11, 12 deliver the one or more additives to die assembly 20 located at the end of extruder 60. More specifically, pump 11 circulates the one or more additives from additive supply 10 to metering pump 12, and any additive that is not taken away by metering pump 12 is returned back to additive supply 10 by way of recirculation line 13. The recirculation of the one or more additives provides ample pressure, i.e., from about 30 to about 5,000 psig, to feed inlet 14 of metering pump 12. From metering pump 12, the one or more additives is transferred to die assembly 20 by means of distribution line 15, which may be heat traced, high-pressure tubing or piping. Die assembly 20, which will be described in more detail below, preferably contains distribution plate 21, thin-plate assembly 22, and die head plate 23 (FIGS. 2–4). Simultaneously, solid particles of polymer are fed into hopper 61 and flow from hopper 61 into extruder 60 where the polymer is extruded. The extruded polymer melt flow is then fed to die assembly 20 where the one or more additives is injected into one or more predetermined locations along the cross-section of the polymer melt flow as the melt flow passes through die assembly 20 and is shaped into strands.

Figure 1B:
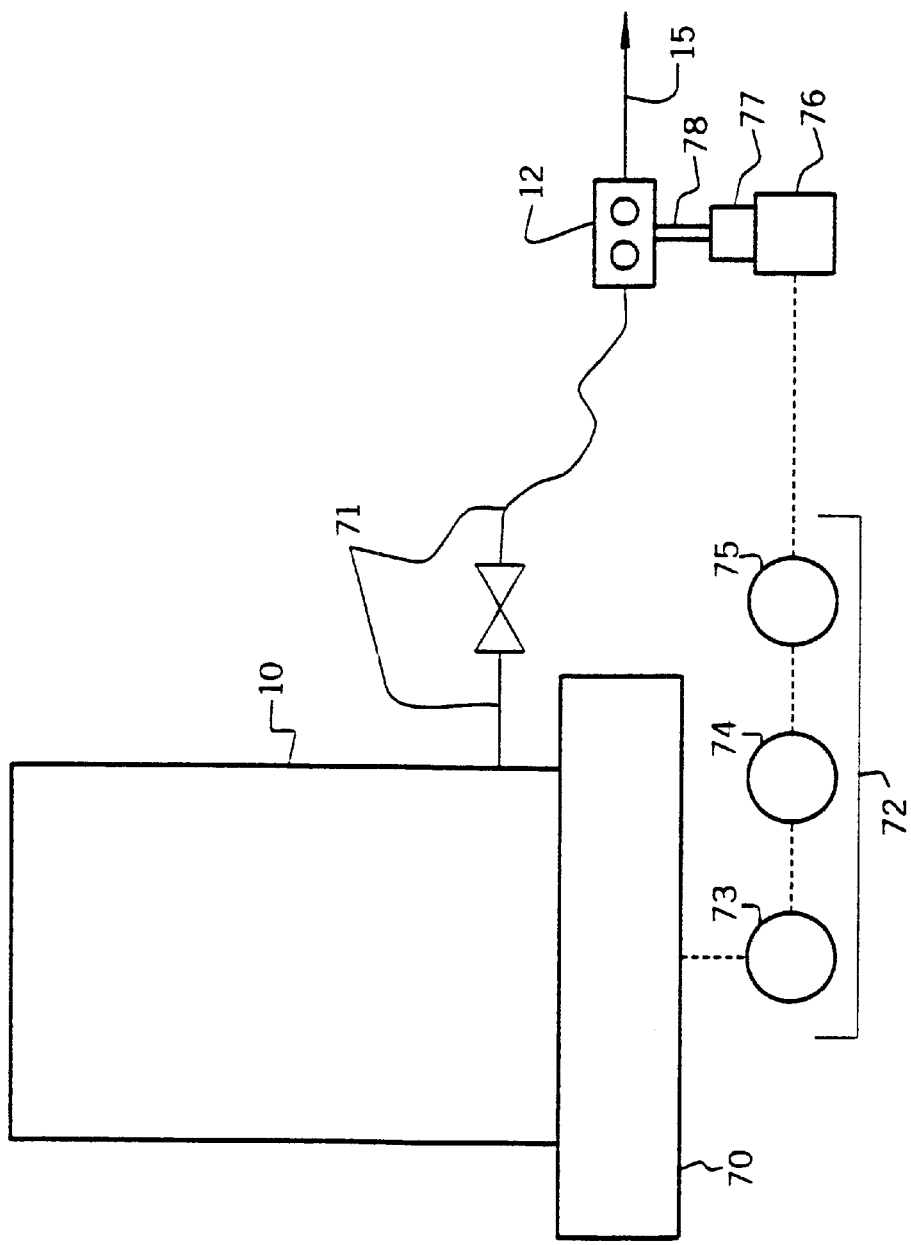
FIG. 1b is a schematic of an alternate pumping system useful in the apparatus of the present invention.

In another embodiment, as seen in FIG. 1b, the pumping system can be a weight loss feeder system such as those known in the art of chemical dispensing. An example of a commercially available weight loss feeder system is a K-Tron Soder liquid loss-in-weight feeder system made by K-Tron International of Pitman, N.J. In this embodiment, additive supply 10 is placed upon weight scale 70 that measures the weight of additive supply 10 and its liquid contents. A heated distribution line 71 connects additive supply 10 to metering pump 12 without interfering with the movement of the weight scale. Metering pump 12 delivers the one or more additives to die assembly 20 (FIG. 1) via distribution line 15. A control system 72 calculates the loss in weight of additive supply 10 over a given period of time, which is the metering pump delivery rate. A time period of from 0 to 60 seconds is generally sufficient to provide accurate flow delivery. The control system, therefore, can control the pump speed in order to provide the proper delivery rate of one or more additives to die assembly 20. Control system 72 may include weight transmitter 73, weight loss controller 74, and metering pump drive motor inverter 75, which is connected to metering pump motor 76, metering pump motor gear box 77, and metering pump drive shaft 78.

Figure 1C:
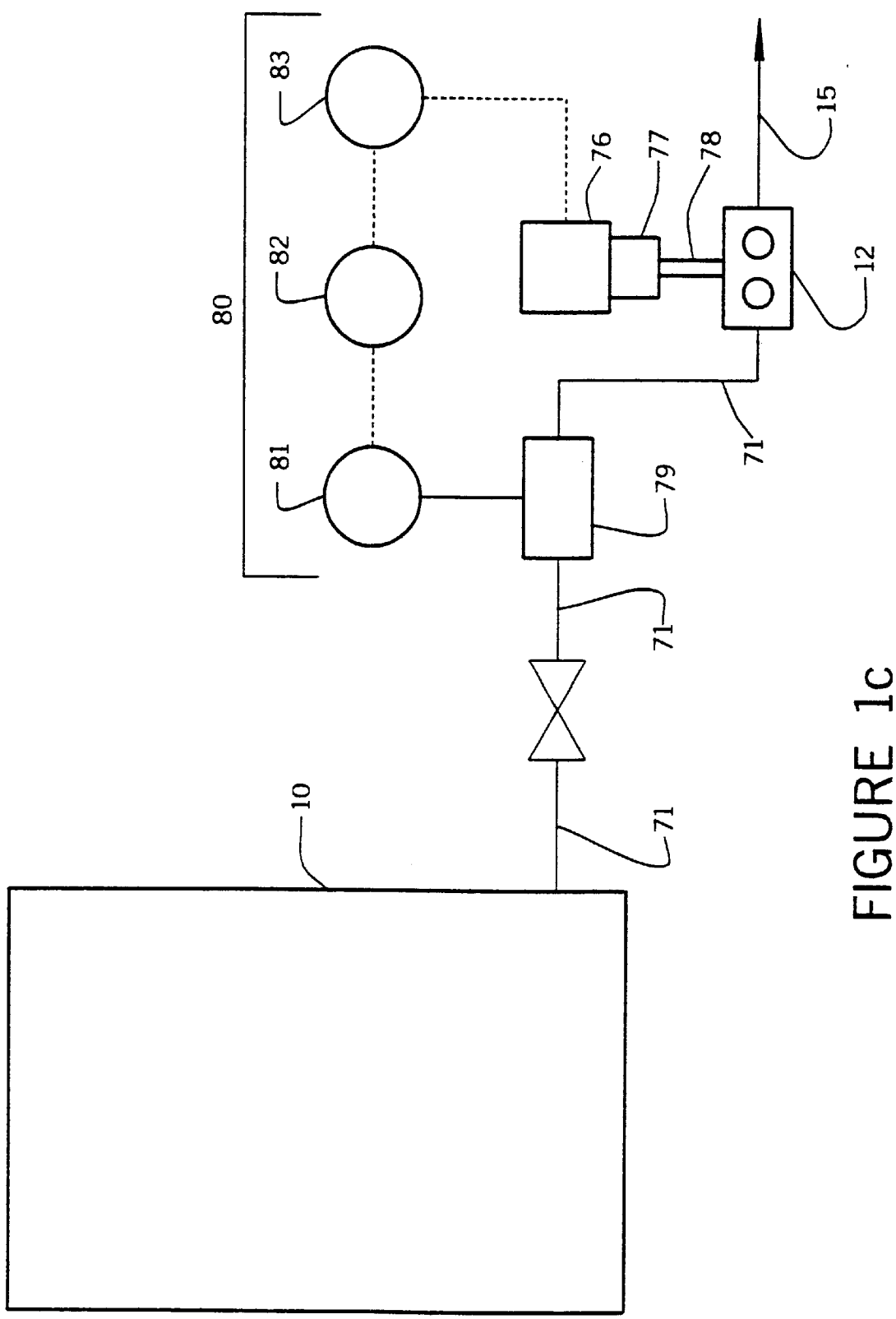

FIG. 1c illustrates yet another embodiment of the pumping system. In this embodiment, a flow sensor may be used in place of the weight scale to measure the flow and to control the pump. As shown in FIG. 1c, heated distribution line 71 connects additive supply 10 to flow sensor 79 and then to metering pump 12. Metering pump 12 delivers the one or more additives to die assembly 20 (FIG. 1) via distribution line 15. A control system 80 determines the flow rate, which is the metering pump delivery rate. The control system, therefore, can control the pump speed in order to provide the proper delivery rate of one or more additives to die assembly 20. Control system 80 may include flow transmitter 81, flow indicating controller 82, and metering pump drive motor inverter 75, which is connected to metering pump motor 76, metering pump motor gear box 77, and metering pump drive shaft 78.

The thin-plate assembly used in the present invention contains at least two thin plates. Each plate in the thin-plate assembly preferably is as flat as possible and is free of scratches. The number of thin plates in the assembly will depend on the complexity of the component distribution desired in the final product. Typically, from 1 to about 5 plates are used, although more plates can be used in the method and apparatus of this invention. Each thin plate typically has a thickness of less than about 0.25 inch and, more preferably, of from about 0.001 to about 0.10 inch.

The thin plates are preferably made from metal. Suitable metals for use in the thin plates include, for example, stainless steel, aluminum and aluminum-based alloys, nickel, iron, copper and copper-based alloys, mild steel, brass, titanium, and other micromachineable metals. Because it is relatively inexpensive, stainless steel is preferably used.

Each thin plate has a first facial surface and an opposite second facial surface, wherein on either or both of the first facial and second facial surfaces, multiple distribution paths are formed by an etching (or micromachining) process. The multiple distribution flow paths have a flow pattern effective to distribute and arrange the polymer melt flow and the one or more additives in a predetermined spatial configuration. The specific flow pattern will depend on the desired placement of the one or more additives into or on the polymer melt flow.

Typically, the multiple distribution flow paths in the thin plates are composed of multiple distribution flow channels and multiple distribution flow apertures (or "through holes"), wherein the distribution flow channels have a lesser depth than the thickness of the thin plates, and further wherein the distribution flow apertures communicate between the first facial surface and the second facial surface of the thin plates. Preferably, at least some of the distribution flow apertures are in communication with respective distribution channels.

The multiple distribution flow paths are formed in the first and/or second facial surfaces of the thin plates by etching (or micromachining) processes such as, for example, photochemical and laser etching, stamping, punching, pressing, cutting, molding, milling, lithographing, particle blasting, reaming, or combinations thereof. According to the current preference, the flow paths may be photochemically etched into the surfaces.

The advantages of thin plates are well known in the art and include, for example, relative ease in producing, cleaning, and inspecting the plates. Thin plates are also inexpensive, disposable, easily changeable, and capable of distributing and combining a plurality of components in a predetermined configuration with respect to each other.

As noted above, the configuration of thin-plate assembly 22 of die assembly 20 depends on the desired placement of the one or more additives in the polymer. While the number of through holes and distribution channels in the thin plates varies, what follows are descriptions of the preferred embodiments of the thin plates. FIG. 2 is an exploded view of one configuration of die assembly 20 used in the apparatus of the present invention. In this configuration, thin-plate assembly 22 is designed such that one or more additives may be placed into the core of three separate polymer strands, as in a core/sheath configuration.

In FIG. 2, die assembly 20 has a thin-plate assembly 22 that includes thin plates 24, 25 sandwiched between distribution plate 21 and die head plate 23. Dowel pin 16 is used to align thin plates 24, 25 with distribution plate 21. Die assembly 20 is connected to the die head (not shown) of extruder 60 (FIG. 1) using a plurality of bolts 51. Distribution line 15 is connected to inlet connection 17 located on the side of die head plate 23 using a high-pressure tubing connector (tubing fitting) 18. Distribution line 15 may be high-pressure tubing or piping. Tubing connector 18 may also be a welded connector, threaded connector, or another commonly used connector. The one or more additives in metering pump 12 (FIG. 1) is transferred to die assembly 20 via distribution line 15 and enters die assembly 20 through inlet connection 17 in die head plate 23. The one or more additives then flows through hole 26 in die head plate 23, through hole 27 in thin plate 24, and through hole 28 in thin plate 25. At thin plate 25, the one or more additives hydraulically splits into three equal streams through three channels 29, 30, 31 in thin plate 25. Channels 29, 30, 31, which are all of equal length, direct the additive streams into holes 32, 33, 34 in thin plate 25 and then into the cores of the three different strands of the polymeric host material via holes 35, 36, 37 in thin plate 24. Simultaneously, polymeric host material supplied from extruder 60 is directed into central channel 38 of distribution plate 21. Distribution plate 21 divides the polymeric host material into three sections of four polymer streams each using distribution holes 39a–d, 40a–d, 41a–d that have been drilled into distribution plate 21. The polymer streams then flow through holes 42a–d, 43a–d, 44a–d in thin plate 25 to thin plate 24 where the polymer streams are combined with the additive streams using "X" patterns 45, 46, 47 in plate 24 to converge the four separate polymer streams in each region into a sheath of polymeric host material that surrounds an additive core.

Figure 3A:
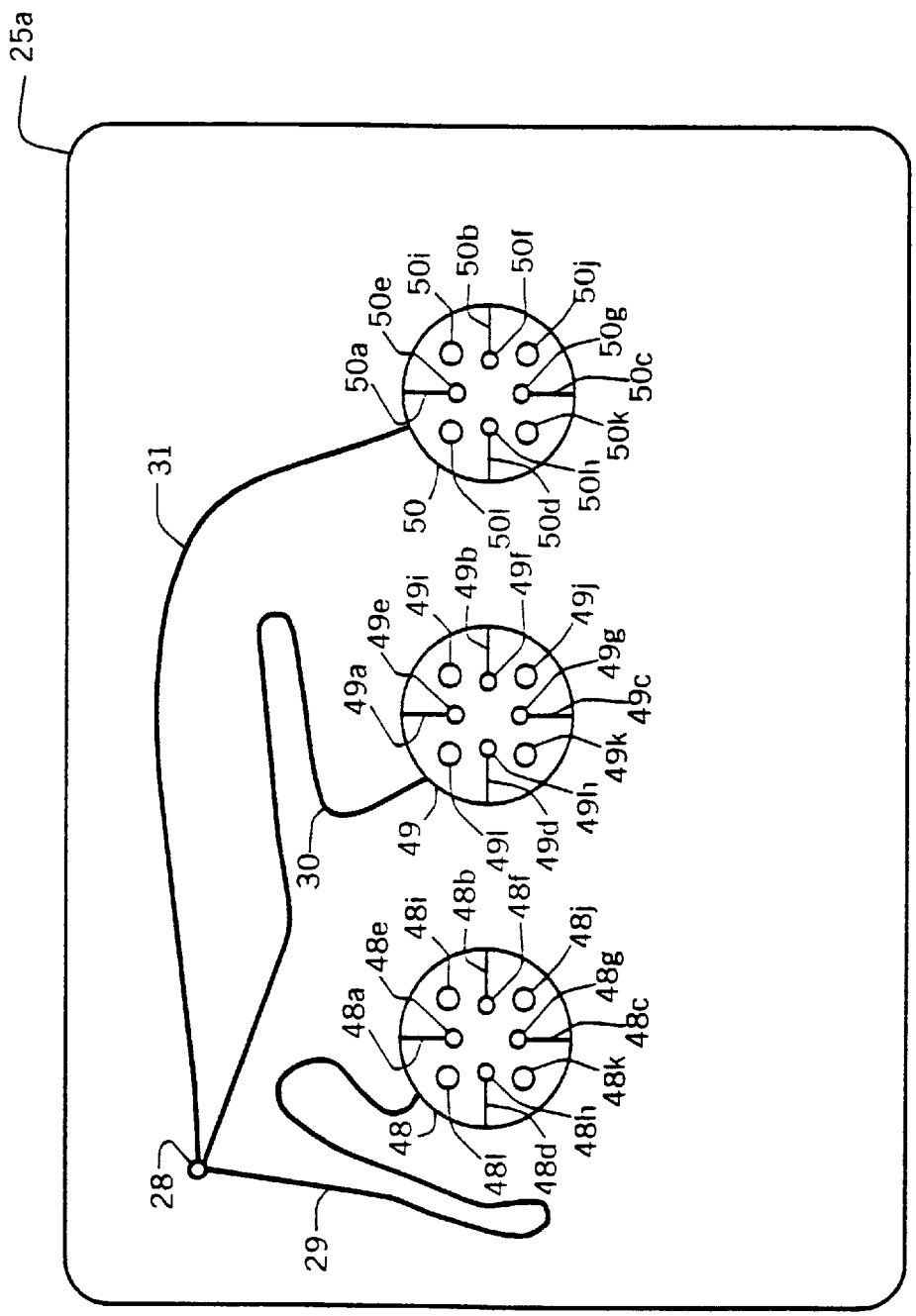
FIG. 3a is a schematic diagram of one of the plates of the thin-plate assembly shown in FIG. 3.

In FIG. 3, there is shown an exploded view of a second configuration of the thin-plate assembly 22 of die assembly 20. In this configuration, thin-plate assembly 22 allows for placement of one or more additives inside of each of three strands of the polymeric host material in an islands-in-a-sea arrangement. The one or more additives in metering pump 12 (FIG. 1) is transferred to die assembly 20 via distribution line 15 and enters die assembly 20 through inlet connection 17 located on the side of die head plate 23. The one or more additives then flows through hole 26 in die head plate 23, through hole 27 in thin plate 24, and through hole 28 in thin plate 25a where the one or more additives then hydraulically splits into three equal streams and flows through channels 29, 30, 31 in thin plate 25a. From each of channels 29, 30, 31, the additive streams are transferred to distribution channels 48, 49, 50 located around the regions of polymer holes 48i–l, 49i–l, 50i–l (FIG. 3a). Distribution channels 48, 49, 50 preferably are spherical (e.g., circular, oval-shaped, ellipse-shaped, etc.), though any shape that allows for distribution of the additive streams is contemplated. Next, from distribution channels 48, 49, 50, the additive streams are transferred to channels 48*a–d,* 49*a–d,* 50*a–d* (FIG. 3*a*). Channels 48*a–d,* 49*a–d,* 50*a–d,* which are similar to spokes on a wheel, are of equal length. Channels 48*a–d,* 49*a–d,* 50*a–d* direct the additive streams from each of distribution channels 48, 49, 50 to holes 48*e–h,* 49*e–h,* 50*e–h* (FIG. 3*a*) in thin plate 25*a.* The additive streams then flow into holes 45, 46, 47 in thin plate 24 so that the additive steams may be placed as four islands in each of the polymer strands. Simultaneously, the polymeric host material supplied by extruder 60 is directed into central channel 38 of distribution plate 21. Distribution plate 21 divides the polymer stream into three sections, each section having four polymer streams, using distribution holes 39*a–d,* 40*a–d,* 41*a–d* drilled into distribution plate 21. The polymer streams then flow through holes 48*i–l,* 49*i–l,* 50*i–l* (FIG. 3*a*) in thin plate 25*a* and are combined with the additive islands in thin plate 24. Thin plate 24 has "X" patterns 45, 46, 47 that converge the four separate polymer streams of each region to form the sea that encapsulates the four additive islands.

Figure 4A:
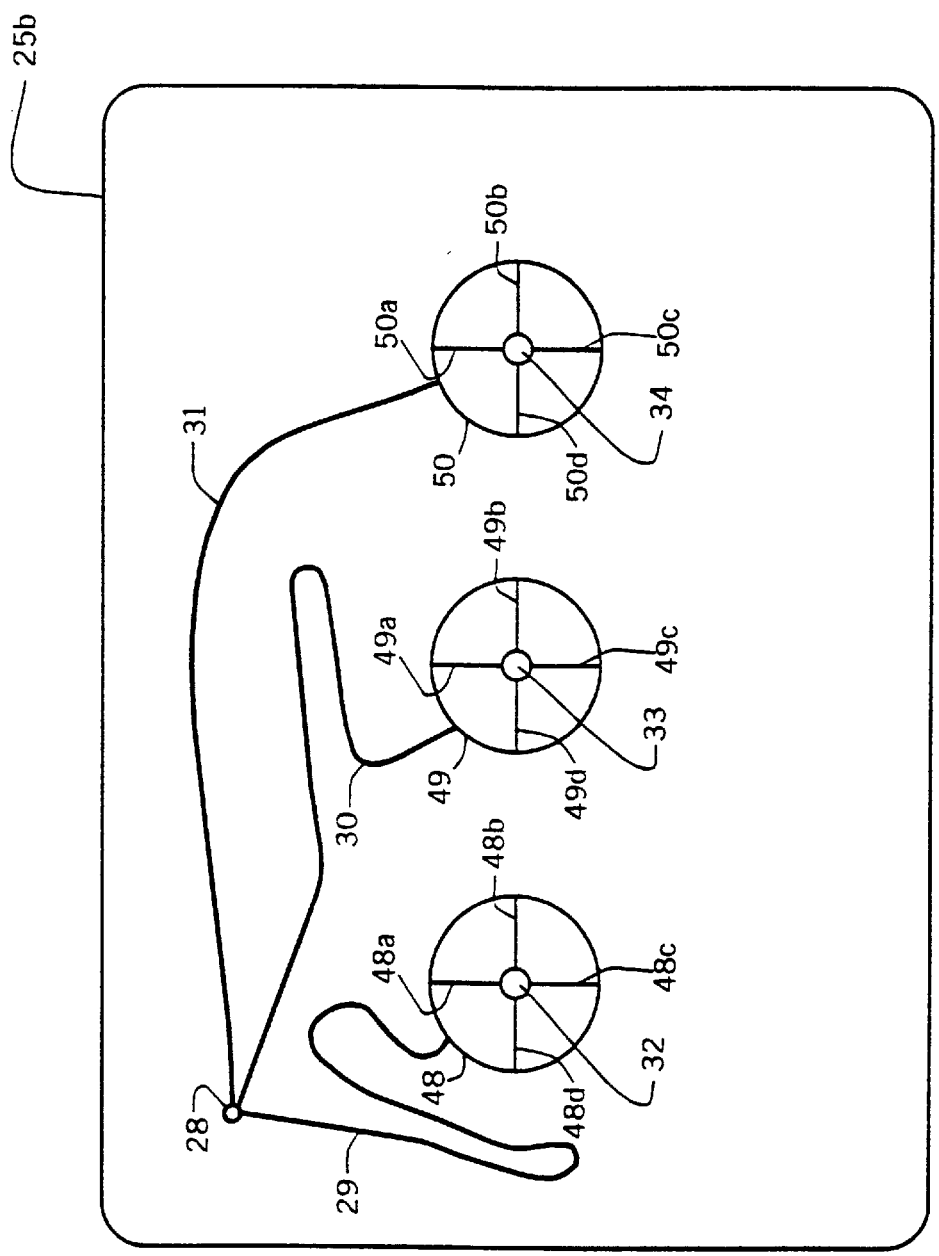
FIG. 4a is a schematic diagram of one of the plates of the thin-plate assembly shown in FIG. 4.

FIG. 4 shows yet another configuration of thin-plate assembly 22 of die assembly 20 useful in the method and apparatus of the present invention. In FIG. 4, thin-plate assembly 22 is configured such that one or more additives may be placed in a pattern of four stripes on the surface of each polymer strand. The one or more additives in metering pump 12 (FIG. 1) is transferred to die assembly 20 via high-pressure tubing or piping 15 and enters die assembly 20 through inlet connection 17 located on the side of die head plate 23. The one or more additives then flows through hole 26 in die head plate 23 and hole 28 in thin plate 25*b* where the one or more additives hydraulically splits into three equal streams in channels 29, 30, 31 in thin plate 25*b.* From each of channels 29, 30, 31, the additive streams are transferred to distribution channels 48, 49, 50. Distribution channels 48, 49, 50 preferably are spherical (e.g., circular, oval-shaped, ellipse-shaped, etc.), though any shape that allows for distribution of the additive streams is contemplated. Next, from distribution channels 48, 49, 50, the additive streams are transferred to channels 48*a–d,* 49*a–d,* 50*a–d* (FIG. 4*a*). Channels 48*a–d,* 49*a–d,* 50*a–d,* which are similar to spokes on a wheel, are of equal length. Channels 48*a–d,* 49*a–d,* 50*a–d* direct the additive streams around the outside of the polymer strand holes 32, 33, 34. Simultaneously, the polymeric host material supplied by extruder 60 is directed into central channel 38 of distribution plate 21. Distribution plate 21 divides the polymeric host material into three sections of four polymer streams each using distribution holes 39*a–d,* 40*a–d,* 41*a–d* drilled into distribution plate 21. The polymer streams then flow into "X" patterns 45, 46, 47 in thin plate 24 which converge the four separate polymer streams of each region into a single polymer strand before the additive stripes are added as the polymer strand passes by thin plate 25*b.*

With each thin-plate assembly, after the one or more additives is incorporated into the polymer melt flow, the strands of polymeric host material containing the one or more additives exit die assembly 20 and may then pass through water bath 62 and into pelletizer 63, which cuts the polymer strands into pellets or chips.

The invention will be further described by reference to the following detailed examples. The examples are set forth by way of illustration and are not intended to limit the scope of the invention.

EXAMPLE 1

A die containing a thin-plate assembly of the four islands-in-a-sea configuration is designed to inject a low molecular weight lubricant (zinc stearate) into nylon 6 (Ultramid B3 available from BASF Corporation of Mount Olive, N.J.), while the passing the nylon 6 through a die and shaping it into strands for pelletizing. The zinc stearate is injected into the nylon 6 having a relative viscosity (in sulfuric acid) of 3.0. At the beginning of the experiment, the metering pump is started a few minutes before the extruder to prevent the nylon 6 from plugging up the holes in the thin plates for the zinc stearate. The following settings are used:

| | |
|---|---|
| Extruder: | ZSK25 Werner & Pfleiderer co-rotating twin screw |
| Screw speed: | 300 rpm |
| Barrel temperature: | 259° C. |
| Die head temperature: | 300° C. |
| Extruder output: | 20 kg/hour (333 g/minute) of nylon 6 |
| Metering pump size: | 0.16 cc/rev |
| Metering pump temperature: | 150° C. |
| Additive supply temperature: | 150° C. |
| Transfer tubing temperature: | 180° C. |

Examination of the cross-section of the resulting polymer strands shows that while the four islands appear to have collapsed into a single core, the zinc stearate is uniformly dosed along the length (i.e., in the extrusion direction) of the cross-section but not mixed with the nylon 6 to form a single phase. The collapse of the four islands into a single core is thought to be the result of the differences in the viscosity of the zinc stearate and the nylon 6, i.e., the component having the lower viscosity migrates to the center.

EXAMPLE 2

A die containing a thin-plate assembly is designed to inject polypropylene wax dyed with 1 percent Heliogenblue (blue dye) onto the surface and into the melt core of polystyrene 168N strands. The thin plate assembly for samples 2 and 3 is a sheath/core configuration, and the thin plate assembly for samples 4 and 5 is a four stripes configuration. At the beginning of the experiment, the metering pump is started a few minutes before the extruder to prevent the polystyrene 168N from plugging up the distribution holes in the thin plates for the polypropylene wax. The following settings are used:

| | |
|---|---|
| Extruder: | ZSK25 Werner & Pfleiderer co-rotating twin screw |
| Screw speed: | 300 rpm |
| Barrel temperature: | 250° C. |
| Die head temperature: | 300° C. |
| Extruder output: | 30 kg/hour (500 g/minute) of polystyrene 168N |
| Metering pump size: | 0.16 cc/rev |
| Metering pump temperature: | 150° C. |
| Additive supply temperature: | 130° C. |
| Transfer tubing temperature: | 170° C. |

Examination of the cross-sections of the resulting polymer strands of samples 2 and 3 shows two separate domains, a "star-shaped" core domain of polypropylene wax surrounded by a nylon 6 sheath domain. The "star-shaped" core is thought to be caused by the viscosity differences between polystyrene 168N and polypropylene wax.

Examination of the cross-sections of the resulting polymer strands of samples 4 and 5 indicates four stripes of polypropylene wax on the outside surface of the polystyrene core.

EXAMPLE 3

A die containing a thin-plate assembly is designed to inject a low molecular weight lubricant (zinc stearate) into nylon 6 (Ultramid B3 supplied by BASF Corporation of Mount Olive, N.J.), while passing the nylon 6 through a die and shaping it into strands for pelletizing. The thin plate assembly for samples 6 and 7 is a four stripes configuration, and the thin plate assembly for sample 8 is a four islands-in-a-sea configuration. At the beginning of the experiment, the metering pump is started a few minutes before the extruder to prevent the Ultramid B3 polymer from plugging up the distribution holes in the thin plates for the zinc stearate. The following settings are used:

| | |
|---|---|
| Extruder: | ZSK25 Werner & Pfleiderer co-rotating twin screw |
| Screw speed: | 300 rpm |
| Barrel temperature: | 260° C. |
| Die head temperature: | 260° C. |
| Extruder output: | 30 kg/hour (500 g/minute) of Ultramid B3 |
| Metering pump size: | 0.16 cc/rev |
| Metering pump temperature: | 140° C. |
| Additive supply temperature: | 130° C. |
| Transfer tubing temperature: | 140° C. |

Examination of the cross-sections of the resulting polymer strands of samples 6 and 7 indicates four stripes of zinc stearate on the outside surface of the nylon 6 core. Sample 8 produced a cross-section having a single core of zinc stearate in the center of the cross-section surrounded by a sheath of nylon 6, as in Example 1.

While the invention has been described in connection with what is presently considered to be the most practical and preferred embodiment, it is to be understood that the invention is not to be limited to the disclosed embodiment, but on the contrary, is intended to cover various modifications and equivalents arrangements included within the spirit and scope of the appended claims.

What is claimed is:

1. An elongate multiphase extruded polymeric pellet having a lengthwise extrusion axis corresponding to the extrusion direction of the pellet, and comprising a host polymeric material and at least one additive uniformly dosed within said host polymeric material, wherein said at least one additive is selected from the group consisting of antistatic agents, blowing agents, delusterants, dye regulating agents, fillers, flame retardants, heat stabilizers, light stabilizers, lubricants, pigments, and plasticizers and combinations thereof, and wherein the additive occupies at least one predetermined location in the cross-section of the pellet without homogenous mixing between the additive and the host polymeric material so as to establish (i) one phase which includes the at least one additive at the at least one predetermined cross-sectional location along the lengthwise extrusion axis of the pellet, and (ii) another phase along the lengthwise axis of the pellet which includes the host polymeric material.

2. A pellet according to claim 1, wherein the additive is a lubricant.

3. The pellet of claim 2, wherein the lubricant is selected from the group consisting of zinc stearate and calcium stearate.

4. The pellet of claim 3, wherein the pellet comprises a core formed by said one phase and a sheath surrounding said core which is formed by said another phase.

5. The pellet of claim 3, wherein said one and another phases comprised respectively of the at least one additive and the host polymeric material are in an islands-in-a-sea arrangement, and wherein said one phase comprises the islands and said another phase comprises the sea.

6. The pellet of claim 3, wherein said one phase comprised of the at least one additive includes stripes on the surface of the host polymeric material.

7. A pellet according to claim 1, wherein the polymeric host material is selected from the group consisting of polyamides, polyesters, polystyrene, acrylics, polyolefins, and combinations thereof.

8. The pellet of claim 7, wherein the polymeric host material is polyamide.

9. The pellet of claim 8, wherein the polyamide is nylon 6.

* * * * *